United States Patent [19]

Kuchler et al.

[11] Patent Number: 5,346,937
[45] Date of Patent: Sep. 13, 1994

[54] MODIFYING AGENTS FOR THERMOSETTING RESINS AND THERMOSETTING RESINS PREPARED USING THESE AGENTS

[75] Inventors: Josef Kuchler, Trostberg; Hans-Georg Erben, Rosenheim; Josef Seeholzer, Trostberg, all of Fed. Rep. of Germany

[73] Assignee: SKW Trostberg Aktiengesellschaft, Trostberg, Fed. Rep. of Germany

[21] Appl. No.: 74,548

[22] Filed: Jun. 11, 1993

Related U.S. Application Data

[63] Continuation-in-part of Ser. No. 861,960, Apr. 2, 1992, abandoned.

[30] Foreign Application Priority Data

Apr. 6, 1991 [DE] Fed. Rep. of Germany ....... 4111142

[51] Int. Cl.$^5$ ...................... C08G 12/40; C08G 12/34
[52] U.S. Cl. ......................................... 524/47; 524/49; 524/50; 527/305; 527/309; 527/312
[58] Field of Search ............................. 524/47, 49, 50; 527/305, 309, 312, 315

[56] References Cited

U.S. PATENT DOCUMENTS 2,197,357  4/1940  Widmer et al. ...................... 527/309
5,055,541 10/1991  Floyd et al. ......................... 527/300

FOREIGN PATENT DOCUMENTS 1464014  2/1977  United Kingdom .

*Primary Examiner*—John Kight, III
*Assistant Examiner*—Jeffrey Culpeper Mullis
*Attorney, Agent, or Firm*—Kenneth P. Glynn; Diane L. Ferrone

[57] ABSTRACT

The present invention relates to modifying agents for melamine-formaldehyde resins and highly reactive thermosetting resins which are prepared with this agent and consist of 1 mol of melamine, 1.5 to 3.5 mol of formaldehyde, 0.5 to 5% by weight of a polyhydric alcohol, based on the melamine plus formaldehyde, and 0.5 to 10% by weight of the modifying agent, based on the liquid resin. The modifying agent can be added to the melamine-formaldehyde resin as a pulverulent mixture before or during the condensation reaction or in the liquid state in the form of a condensation product prepared in a known manner. The modifying agent consists of 10 to 75% by weight of dicyandiamide, 5 to 70% by weight of cold water-soluble starch (soluble between about 18° and about 25° C.) and 20 to 85% by weight of a guanamine. The highly reactive resins modified in this way are preferably used for coating chipboard and hardboard by a short cycle process.

16 Claims, No Drawings

MODIFYING AGENTS FOR THERMOSETTING RESINS AND THERMOSETTING RESINS PREPARED USING THESE AGENTS

REFERENCE TO RELATED CASE

This application is a continuation-in-part of copending United States patent application Ser. No. 07/861,960, filed on Apr. 2, 1992, now abandoned, by Josef Kuchler, Hans-Georg Erben and Josef Seeholzer, inventors, entitled "Modifying Agent for Thermosetting Resins and Thermosetting Resins Prepared Using this Agent," and incorporated by reference herein.

BACKGROUND OF THE INVENTION

1. Field of the Invention

The invention relates to modifying agents for melamine-formaldehyde resins, a highly reactive, modified thermosetting resin based on a melamine-formaldehyde condensation product and the use of the modifying agent for the preparation of thermosetting resins, laminates, and coated sheets.

2. Relevance of the Prior Art

Precondensed, aqueous or aqueous-alcoholic solutions of melamine-formaldehyde resins are known in the art to be outstandingly suitable for impregnation of absorbent carrier materials, such as, for example, paper webs or non-woven materials or fabrics, which are dried after the impregnation and finally processed to laminates (layered material) by hot pressing, or for improving the surface of derived timber products, for example hardboard or wood chipboard. Suitable resins are taught, for example, in U.S. Pat. No. 2,197,357 to Widmer et al issued Apr. 16, 1940.

Hard, scratch-resistant surface coatings which are resistant to water and chemicals are obtained using such melamine impregnating resins. Such properties are required, above all, in furniture construction.

The use of pure melamine resin for impregnating carrier materials meets with certain difficulties inasmuch as the pressing pressures must be very high and the pressing times must be relatively long. Resin films finished with such resins and pressed, for example, onto chipboard are moreover susceptible to cracking, especially after a relatively long storage time, which is why improvements have been sought in this respect. Possibilities for avoiding such difficulties are known in the art and resins suitable for particularly rapid curing and processing, known as short cycle resins, have been developed. These advancements may include the modification of melamine resins by replacing some of the melamine by other condensable products, such as urea or glycols. For example, GB 1 464 014 claims an impregnating resin based on an aqueous condensation product of melamine and formaldehyde that is characterized by the melamine replacing addition of saccharose or α-methylglycoside and 0.5 up to 7% by weight of the resin part in the solution of a diol with 2 to 4 carbon atoms, such as ethylenglycol, 1,3- and 1,2-propylenglycol or 1,2-, 1,3- or 1,4-butandiol.

Such modified resins have improved flow properties, but although useful surfaces have already been obtained with them under lower pressure and over shorter reaction times, their properties were not satisfactory in all respects. In particular, a more pronounced tendency to yellow at higher temperatures which are recommended if short reaction times are applied and a reduced gloss of the surfaces produced with such resins was apparent.

SUMMARY OF THE INVENTION

The present invention relates to modifying agents for melamine-formaldehyde resins and highly reactive thermosetting resins which are prepared with this agent and consist of 1 mol of melamine, 1.5 to 3.5 mol of formaldehyde, 0.5 to 5% by weight of a polyhydric alcohol, based on the melamine plus formaldehyde, and 0.5 to 10% by weight of the modifying agent, based on the liquid resin. The modifying agent can be added to the melamine-formaldehyde resin as a pulverulent mixture before or during the condensation reaction or in the liquid state in the form of a condensation product prepared in a known manner. The modifying agent consists of 10 to 75% by weight of dicyandiamide, 5 to 70% by weight of cold water-soluble starch (soluble between about 18° and 25° C.) and 20 to 85% by weight of a guanamine. The highly reactive resins modified in this way are preferably used for coating chipboard and hardboard by a short cycle process.

DETAILED DESCRIPTION OF THE INVENTION

The object of the present invention was therefore to provide highly reactive impregnating resins which do not have the above-mentioned adverse properties in a short cycle process, that is to say over pressing times of 10 to 60 seconds, and impart a uniform, smooth, closed surface and high gloss values to the coatings produced with them, which coatings should show no tendency to yellow and have no tendency to crack.

This object was achieved by a modifying agent consisting of 10 to 75% by weight of dicyandiamide, 5 to 70% by weight of cold water-soluble starch (soluble at about 18° and about 25° C.) and 20% to 85% by weight of a guanamine of the general formula

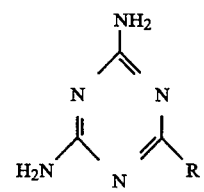

wherein R represents a methyl or phenyl radical or a phenyl radical substituted by an alkyl group, which is added to the resin in an amount of 0.5 to 10% by weight (based on the liquid resin).

The invention thus relates to a modifying agent for thermosetting resins which are based on melamine plus formaldehyde and consist of several components, the agent being added to an impregnating resin, for example, consisting of melamine, formaldehyde and a polyhydric alcohol, under certain pH and temperature conditions.

Although numerous modifying agents for melamine-formaldehyde resins have already been reported, the coatings produced with these have not been completely satisfactory in their properties. If the resin was adequately plasticised, the pressing times were often too long, or it was impossible to achieve the required surface quality over shorter pressing times. The resistance of the surfaces to acid and boiling also often suffered on introduction of such innovations.

It was therefore completely surprising that water-soluble impregnating resins which are stable in aqueous solution for a sufficiently long time can be obtained by addition of a modifying agent consisting of a guanamine, dicyandiamide and a cold water-soluble starch under certain conditions. Melamine-formaldehyde resins to which such a modifying agent has been added meet all the requirements imposed on such resins with respect to the physical and chemical properties of the surfaces produced with the resins.

The use of acetoguanamine as a modifying agent for impregnating resins is known in the art. It is used in particular for the preparation of impregnating resins for the production of high pressure laminated sheets. The delayed curing of acetoguanamine in comparison with melamine is utilized for this type of surface finishing, so that these high pressure laminated sheets can also be subsequently deformed. The finding that acetoguanamine can be employed in combination with dicyandiamide and a cold water soluble potato starch as a modifying agent for low pressure short cycle resins was accordingly all the more surprising. The resins modified in this way can even be formulated, with a small addition of a curing agent, to cure so quickly that complete curing of the resin film is achieved at 160° to 175° C. within 10 seconds.

Acetoguanamine is particularly suitable as the guanamine in the modifying agent. Aryl- (such as, for example, benzoguanamine) and aralkylguanamines can also be employed, depending on the use of the impregnating resin. The amount of guanamine in the modifying agent is 20 to 85% by weight, and is preferably 30 to 60% by weight.

Commercially available dicyandiamide is used as the dicyandiamide. Its content varies between 10 and 75% by weight in the modifying agent. A potato starch which is soluble in cold water (about 18° to about 25° C.) is used as the starch component, and its content in the modifying agent is 5 to 70% by weight.

The present invention furthermore relates to the process for the preparation of a highly reactive, modified thermosetting resin based on melamine and formaldehyde. Such a thermosetting resin is obtained, for example, by subjecting 1 mol of melamine, 1.5 to 3.5 mol of formaldehyde, 0.5 to 5% by weight of polyhydric alcohol (based on the melamine plus formaldehyde) and 0.5 to 10% by weight of the modifying agent, based on the liquid resin to be modified, to a condensation reaction at a pH of 7.5 to 10 and a temperature of 70° to 100° C. until a water-dilutability of 1:1.0 to 2.0, preferably 1.2 to 1.8, is achieved. The condensation time is 15 to 45 minutes.

Examples of the polyhydric alcohols employed in the melamine-formaldehyde resin are dipropylene glycol, di-isopropylene glycol, dibutylene glycol, di-tert-butylene glycol, ethylene propyl glycol and the like. Ethylene glycol and diethylene glycol are preferably used.

The modifying agent can be added in the form of a powder mixture to the melamine-formaldeyhde condensate at the start of or during the condensation. If the modifying agent is added during the condensation, this leads to resin solutions which are stable for a very long time. In contrast, addition at the start of the condensation phase requires a very short condensation time. Nevertheless, the resin obtained has an adequate stability. As well as being added as a pulverulent mixture, the modifying agent can also be added in the form of a condensation product to the melamine-formaldehyde resin. In this case, the components of the modifying agent are dissolved in a 37% strength formaldehyde solution, condensation is carried out at 90° C. and the agent is added in this form as a condensation product to the melamine-formaldehyde resin.

The modifying agent according to the invention thus allows highly reactive impregnating resins to be prepared, the positive properties of the melamine, such as high hardness and good resistance to chemicals and boiling, being coupled with the positive properties of the acetoguanamine, such as good compatibility with melamine, high gloss, good flow properties, reduction of cracking in the surfaces produced and the like. The disadvantage of the acetoguanamine, that is to say the slower rate of reaction compared with melamine, can be by-passed by addition of starch and dicyandiamide, since, surprisingly, the rate of reaction is increased synergistically during curing. As a positive side effect, these modified resins have a longer storage stability in comparison with resins modified exclusively with acetoguanamine and polyhydric alcohol.

Aqueous resins which are particularly suitable for coating chipboard are those which have a solids content (dry residue) on drying of a sample of the aqueous resin at 105° C. for a period of 30 minutes of 30 to 70% by weight, preferably 50 to 63% by weight. The resins contain melamine and formaldehyde in a molar ratio of 1:1.5 to 1:3.5, preferably 1:1.5 to 1:2.5. They furthermore contain, based on the sum of parts by weight of melamine and formaldehyde, 0.5 to 5% by weight, preferably 1.5 to 3% by weight, of a polyhydric alcohol and 0.5 to 10% by weight, preferably 1.3 to 3.0% by weight, of the modifying agent described above in the form of a mixture of the solid substances.

In addition to the modifying agent being added in the form of the pulverulent mixture of the components, it is also possible to add this in the form of dicyandiamide-acetoguanamine-starch-formaldehyde condensation product to the solution of the fully condensed thermosetting resin in an amount of 0.5 to 10% by weight, preferably 1.5 to 8% by weight, based on the liquid resin to be modified.

The modified thermosetting resins prepared have a storage life of up to more than three weeks and are particularly suitable for the production of coated chipboard by the short cycle pressing process. In addition to their suitability as short cycle laminate resins, the resins produced according to the present invention are also suitable as continuous process laminate resins where they may also be used in the production of laminates by a discontinuous or continuous process, for coating chipboard and hardboard by conventional processes and for the production of compression-molding compositions.

Laminates can be produced with the aid of the resin according to the present invention in presses at 160° to 175° C. in the course of a pressing time of 10 to 50 seconds or continuously in belt presses.

The surfaces of sheets or laminates coated in this way display high gloss values and an excellent closed structure.

Since re-cooling of the sheets in the press can be omitted, this leads to a considerable saving in energy.

The invention is illustrated in more detail below with the aid of examples in which, unless stated otherwise, the quantity data relate to parts by weight.

EXAMPLES

Example 1

Preparation of a highly reactive thermosetting resin 460 parts by weight (4.6 mol) of a 30% strength formaldehyde solution were diluted with 155 parts by weight of water and the pH was brought to 8.35 with 1.4 ml of a 1N sodium hydroxide solution. 350 parts by weight (2.78 mol) of melamine and 12.25 parts by weight of a modifying agent consisting of 20 parts by weight of dicyandiamide, 70 parts by weight of acetoguanamine and 10 parts by weight of a potato starch which is soluble in cold water (about 18° to about 25° C.) were added to this solution. Finally, 12.25 parts by weight of diethylene glycol were added.

This reaction mixture was heated to 90° C. and kept at this temperature for 20 minutes, while stirring. The hydrophobic point was already reached after this short condensation time. After a further 5 minutes, further condensation of the resin solution was interrupted by cooling. The resin solution now had a precipitation number of 1.4 and the flow time of the resin, determined with a Ford cup with a 4 mm nozzle, was 14.5 seconds. The solids content of the resin solution was 57% (at 105° C., 30 minutes). The storage life of the resin solution was 5 to 7 days.

Example 2

Thermosetting resin 500 parts by weight (5.0 mol) of a 30% strength formaldehyde solution were diluted with 100 parts by weight of water and the pH was brought to 9.2 to 9.3 with 1N sodium hydroxide solution. 350 parts by weight (2.78 mol) of melamine and 12.25 parts by weight of diethylene glycol were added to this solution and the mixture was subjected to a condensation reaction at 90° C. for 120 minutes until the hydrophobic point was reached.

After addition of 12.25 parts by weight of the modifying agent according to example 1, the mixture was subjected to further condensation for another 35 minutes, until a precipitation number of 1.6 was reached, and was then cooled rapidly to room temperature. The resin thus obtained had a solids content of 57.3%, exhibited a flow time of 15 seconds (Ford cup; 4 mm nozzle) and had a storage life of longer than 2 weeks.

Example 3

Thermosetting resin

The melamine-formaldehyde resin was prepared according to Example 1 and modified in an analogous manner with 5% by weight (based on melamine plus formaldehyde) of a modifying agent consisting of 50 parts by weight of dicyandiamide, 10 parts by weight of a cold water soluble potato starch (soluble at about 18° to about 25° C.) and 40 parts by weight of acetoguanamine.

Example 4

Thermosetting resin

The melamine-formaldehyde resin was prepared according to Example 1 and modified in an analogous manner with 4% by weight (based on the melamine plus formaldehyde) of a modifying agent consisting of 40 parts by weight of dicyandiamide, 10 parts by weight of a potato starch soluble in cold water (soluble at about 18° to about 25° C.) and 50 parts by weight of benzoguanamine.

Example 4a

Thermosetting resin

An impregnating resin in which only 1% by weight of the modifying agent of example 4 was prepared completely analogously.

Example 5

Preparation of a modifying agent in the form of a condensation product 0.05% by weight of formic acid (based on the formaldehyde) was added to 257 parts by weight (3.17 mol) of a 37% strength formaldehyde solution. 125 parts by weight of a modifying agent consisting of dicyandiamide, potato starch soluble in cold water (soluble at about 18° to about 25° C.) and acetoguanamine in the weight ratio according to Example 1 were introduced into this solution. The reaction mixture was heated to 90° C. and kept at this temperature for 120 minutes. The precipitation number of the condensation product thus obtained was 1.2, its solid content was 56% by weight, the flow time was 24 seconds (Ford cup, 4 mm nozzle) and its storage life was more than 3 weeks.

Example 6

Preparation of a modified thermosetting resin using a modifying agent according to Example 5

1.5 parts by weight (based on the solid substance) of the modifying agent in the form of a condensation product according to Example 5 together with 1.25 parts by weight of diethylene glycol were stirred into 100 parts by weight of a melamine-formaldehyde resin with a ratio of melamine to formaldehyde of 1:2 at room temperature. The modification was thus ended. It was also possible to use ethylene glycol and dipropylene glycol instead of diethylene glycol with the same success.

Example 6a

Thermosetting resin

A more highly modified thermosetting resin was obtained in an analogous manner by addition of 5 parts by weight (based on the solid substance) of the modifying agent according to example 5 to the melamine-formaldehyde resin of Example 6.

Example 7

Comparison example 500 parts by weight (5.0 mol) of a 30% strength formaldehyde solution were diluted with 100 parts by weight of water and the pH was brought to 9.2 to 9.3 with 1N sodium hydroxide solution. 350 parts by weight (2.78 mol) of melamine and 12.25 parts by weight of diethylene glycol were added to this solution and the mixture was subjected to a condensation reaction at 90° C. for 120 minutes until the hydrophobic point was reached.

EXPERIMENTAL TESTING

COATING OF CHIPBOARD

A decorative paper having an ash content of about 38% by weight and a weight per unit area of 75 g/cm$^2$ was impregnated with a modified impregnating resin prepared according to examples 1 through 6 and dried to a moisture content of about 6.5% at 120° C. for 3.5 minutes in a circulating air drying cabinet. The paper then contained about 140% of its weight of resin. Chipboard sheets were covered with paper resin-treated in this way and pressed between high gloss pressing sheets at 160° to 175° C. under 2 MPa for about 10 to 50 seconds. The chipboard sheets were taken out of the press without prior cooling.

TESTING OF THE COATED CHIPBOARD

The coated chipboard produced by the above process was tested by known methods with regard to the closed structure of the surface, the degree of curing, the susceptibility to cracking, the resistance to yellowing, the resistance to acid and the gloss. The results obtained are compared with chipboard coated with an unmodified melamine resin (as prepared in comparison Example 7) and are shown in Table 1.

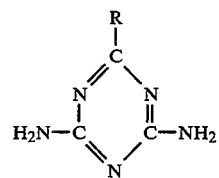

wherein R is a radical selected from the group consisting of methyl, phenyl, and phenyl substituted by an alkyl group.

2. The process of claim 1 wherein said cold water-soluble starch is a potato starch which is soluble at about 18° to about 25°.

3. Process according to claim 1 wherein said guanamine is a benzoguanamine.

4. Process according to claim 1 wherein said gua-

TABLE 1

| Impregnating resin No. | 1 | | 2 | | 3 | | 4 | | 4a | | 6 | | 6a | | 7 | |
|---|---|---|---|---|---|---|---|---|---|---|---|---|---|---|---|---|
| Pressing time (seconds) | 10 | 50 | 10 | 50 | 10 | 50 | 10 | 50 | 10 | 50 | 10 | 50 | 10 | 50 | 10 | 50 |
| Acid test (3% strength HCl) | 1-2 | 1 | 1-2 | 1 | 1 | 1 | 1-2 | 1 | 2 | 1-2 | 1-2 | 1 | 1 | 1 | 2-3 | 2-3 |
| Staining test (Rhodamine B) | 2 | 1-2 | 2 | 1-2 | 1-2 | 1-2 | 2 | 1-2 | 2 | 2 | 2 | 1-2 | 2 | 1 | 3 | 3 |
| Surface curing (Water vapour test) | 1 | 1 | 1 | 1 | 1 | 1 | 1 | 1 | 1 | 1 | 1 | 1 | 1 | 1 | 3 | 2-3 |
| Surface nature (graphite test) | 2 | 1 | 2 | 1 | 2 | 1 | 2 | 1 | 2 | 1-2 | 2 | 1-2 | 2 | 1 | 3 | 3 |
| Cracking test (heat test) | 1 | 1 | 1 | 1 | 1 | 1 | 1 | 1 | 1 | 1 | 1 | 1 | 1 | 1 | 3 | 3-4 |
| Yellowing (15 hours at 140° C.) | 1 | 1 | 1 | 1 | 1 | 1 | 1 | 1 | 1 | 1 | 1 | 1 | 1 | 1 | 1 | 1 |
| Gloss | 2 | 1 | 2 | 1 | 1 | 1 | 2 | 2 | 2 | 1 | 2 | 1 | 2 | 1 | 3-4 | 3 |

1 = very good
2 = good
3 = moderate
4 = poor

Obviously, numerous modifications and variations of the present invention are possible in light of the above teachings. It is therefore understood that within the scope of the appended claims, the invention may be practiced otherwise than as specifically described herein.

What is claimed is:

1. A process for the manufacture of a modified melamine-formaldehyde resin comprising:
   subjecting the following to an aqueous condensation reaction, by combining:
   1 mol of melamine;
   1.5 to 3.5 mol of formaldehyde;
   0.5 to 5% by weight of a polyhydric alcohol based on melamine plus formaldehyde; and,
   0.5 to 10% by weight of a modifying agent based on the weight of the melamine and formaldehyde
   wherein said condensation reaction is at a pH of about 7.5 to about 10 and a temperature of about 70° to about 100° C. up to a water-dilutability of 1:1.0 to 2.0 and wherein said polyhydric alcohol is selected from the group consisting of ethylene glycol, diethylene glycol, dipropylene glycol, diisopropylene glycol, dibutylene glycol, di-tert-butylene glycol and ethylene propyl glycol and wherein said modifying agent comprises:
   a) 10 to 75% by weight of dicyandiamide;
   b) 5 to 70% by weight of cold water soluble starch which is soluble at about 18° to about 25° C.; and,
   c) 20 to 85% by weight of a guanamine of the general formula namine is an acetoguanamine.

5. The process of claim 1 wherein said modified melamine-formaldehyde resin is a laminate resin.

6. The process of claim 5 wherein said laminate resin is a continuous process laminate resin.

7. A process for the manufacture of a modified melamine-formaldehyde resin comprising:
   subjecting the following to a condensation reaction, by combining:
   1 mol of melamine;
   1.5 to 3.5 mol of formaldehyde; and,
   0.5 to 5% by-weight of a polyhydric alcohol based on melamine plus formaldehyde,
   wherein said condensation reaction is at a pH of 7.5 to 10 and a temperature of 70 to 100 degrees centigrade up to a water-dilutability of 1:1.0 to 2.0, and then
   0.5 to 10% by weight of a modifying agent is added based on the weight of the melamine and formaldehyde wherein said modifying agent is a condensation product of
   200 to 300 parts by weight of formaldehyde solution and
   100 to 150 parts by weight of a mixture of
      10 to 75% by weight of dicyandiamide;
      5 to 70% by weight of cold water-soluble starch which is soluble at a temperature of about 18° C. to about 25° C.; and,
      20 to 85% by weight of acetoguanamine.

8. The process according to claim 7 wherein said cold water soluble starch is potato starch which is soluble between about 18° and about 25°.

9. The process of claim 7 wherein said modified melamine-formaldehyde resin is a laminate resin.

10. The process of claim 9 wherein laminate resin is a continuous process laminate resin.

11. A process for the manufacture of a modified melamine-formaldehyde resin comprising:
subjecting the following to an aqueous condensation reaction, by combining:
1 mol of melamine;
1.5 to 3.5 mol of formaldehyde;
0.5 to 5% by weight of a polyhydric alcohol based on melamine plus formaldehyde; and,
0.5 to 10% by weight of a modifying agent based on the weight of the melamine and formaldehyde
wherein said condensation reaction is at a pH of about 7.5 to about 10 and a temperature of about 70° to about 100° C. up to a water-dilutability of 1:1.0 to 2.0 and wherein said polyhydric alcohol is selected from the group consisting of ethylene glycol, diethylene glycol, dipropylene glycol, diisopropylene glycol, dibutylene glycol, di-tert-butylene glycol and ethylene propyl glycol and wherein said modifying agent comprises:
a) 10 to 70% by weight of dicyandiamide;
b) 5 to 70% by weight of cold water soluble starch which is soluble at about 18° to about 25° C.; and,
c) 20 to 85% by weight of a guanamine compound.

12. The process of claim 11 wherein said cold water soluble starch is a potato starch which is soluble at about 18° to about 25° c.

13. Process according to claim 11 wherein said guanamine is a benzoguanamine.

14. Process according to claim 11 wherein said guanamine is an acetoguanamine.

15. The process of claim 11 wherein said modified melamine-formaldehyde resin is a laminate resin.

16. The process of claim 15 wherein said laminate resin is a continuous process laminate resin.

* * * * *